Aug. 26, 1941.  H. LIST  2,253,795
OSCILLATION SCANNING AND MEASURING APPARATUS
Filed June 8, 1938  3 Sheets-Sheet 1
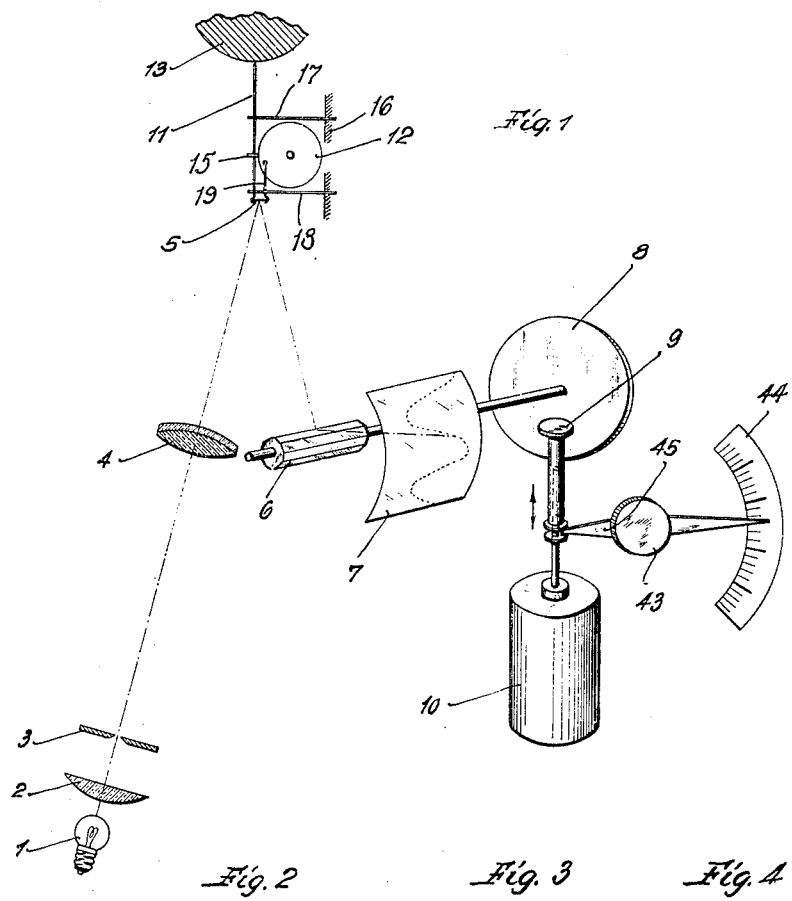
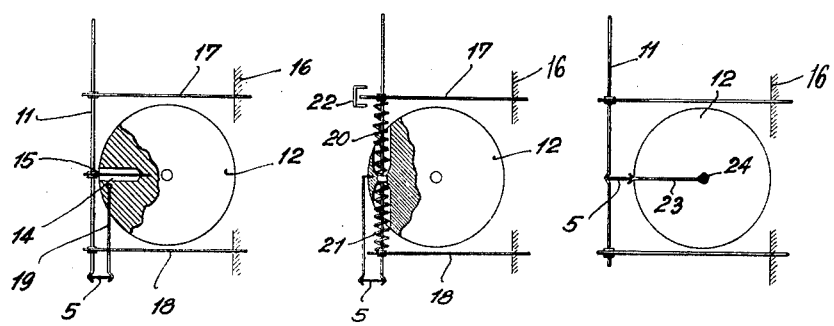
Inventor:

Aug. 26, 1941.    H. LIST    2,253,795
OSCILLATION SCANNING AND MEASURING APPARATUS
Filed June 8, 1938    3 Sheets-Sheet 2
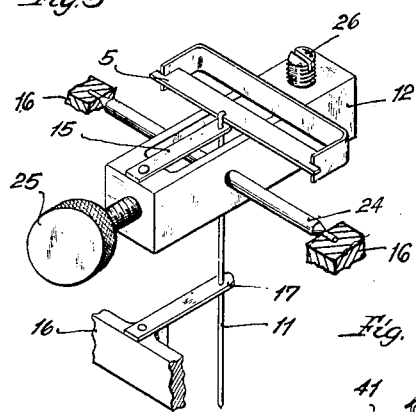
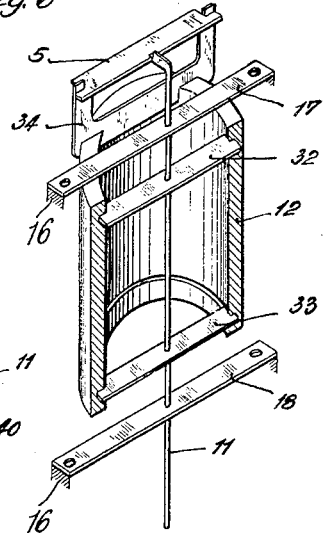
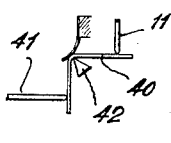
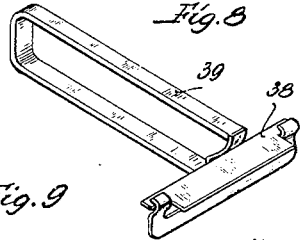
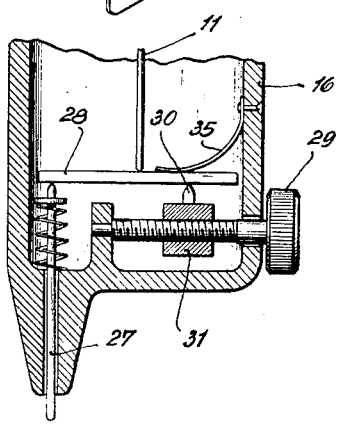
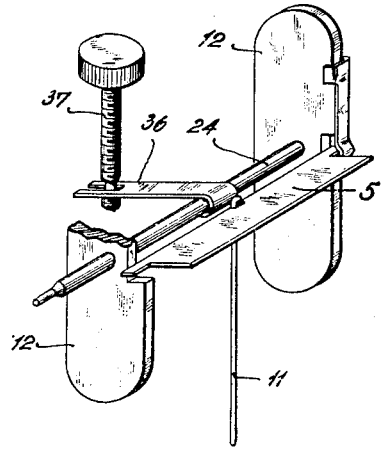

Aug. 26, 1941.  H. LIST  2,253,795
OSCILLATION SCANNING AND MEASURING APPARATUS
Filed June 8, 1938  3 Sheets-Sheet 3
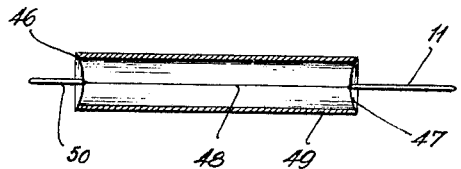
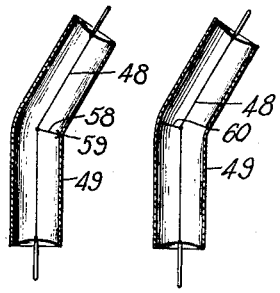
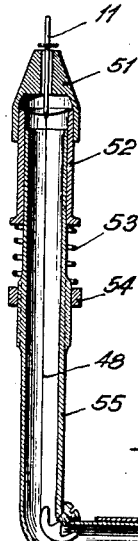
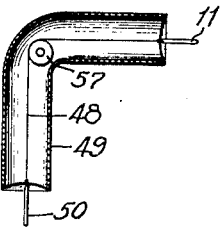
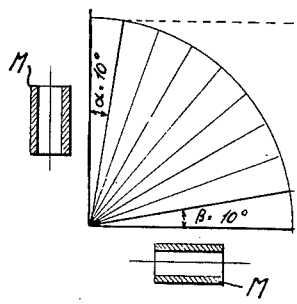
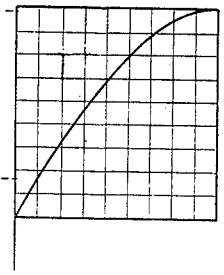
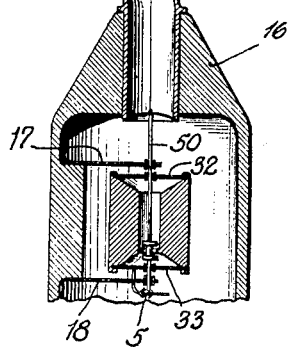

Patented Aug. 26, 1941

2,253,795

UNITED STATES PATENT OFFICE 2,253,795

OSCILLATION SCANNING AND MEASURING APPARATUS

Heinrich List, Berlin-Lichterfelde, Germany

Application June 8, 1938, Serial No. 212,617
In Germany April 28, 1937

12 Claims. (Cl. 73—51)

This invention relates to a mechanical oscillographic apparatus for visually observing oscillations of oscillating bodies in which the oscillatory movement of the body is reproduced in the form of a curve.

The term "oscillation" as used in the present specification and claims is intended to include all periodic movements whether pendulous, vibratory, reciprocating or the like.

The influence of the speed of the deflecting device on the curve can be seen either by means of a revolution indicator or from the position of an interposed transmission gear.

An object of the invention is to enable small fast oscillatory movements to be recorded in the form of a large and easily read curve.

Another object is to make provision ensuring that the curve will be recorded properly on the record plate or sheet without tendency for the zero line of the curve to vary unduly under the influences of forces extraneous to the test.

Another object is to provide an apparatus which will be well adapted for use as a portable or hand apparatus which may be self-contained; for example, the working parts may be operated by an electric dry battery mounted in the housing or other structure of the apparatus.

Another object of the invention is so to support and actuate an optical device which directs the record-making light that said device will move bodily in sympathy with any displacement of the oscillation detecting element of the apparatus due to external forces extraneous to the test without thereby affecting the record of oscillations transmitted by said element from the oscillating body under test to said device. That is to say, where said device is as usual a pivotal mirror, said mirror will be so supported and actuated that it will be caused to oscillate in harmony with the quick oscillation of the test body but will with comparative slowness be displaced bodily, as distinct from pivotally, on the occurrence of displacement in the positional relationship between the apparatus and the test body. As will be obvious, a portable apparatus especially is continuously subject to such displacement.

It is to be understood that the term "displacement" is used herein and in the claims to mean movements which occur slowly or at intervals and is intended to distinguish from the quick oscillatory movements which it is the subject of the test to investigate and indicate or record.

These and other objects will be apparent from the following description and from the appendant claims.

The curve picture or oscillogram appearing on a ground-glass plate (preferably arched) may be photographed and recorded, in sections or continuously, by a film camera mounted in front thereof. However, it is also possible to dispense with the ground-glass plate and to record the curve directly on a strip of sensitized paper (silver bromide paper) mounted in front of or moving past the picture window. In the case of continuous photographing, the speed at the time in question of the drum or tipping mirror is also advantageously recorded at the same time on the film strip, in suitable fashion in the preferred construction.

As usual, oscillation of the body to be examined is transmitted to the apparatus by means of a detector needle. Under the present invention, this needle is made as free as possible from inertia. A light-directing device such as an oscillating mirror is joined, on the one hand, to said needle and, on the other, to a relatively heavy, separately mounted mass which is movable but which by virtue of its weight is insensitive to quick oscillatory forces. In order to render the detector or feeler needle as free from inertia and insensitive to sag as possible, said needle may, for example, be made of a fine aluminium tube.

The mass and the detector needle may be suspended resiliently, relatively to the housing, either in series or in parallel connection, i. e. in the case of series connection the mass is mounted resiliently relatively to the housing and the detector needle resiliently relatively to the mass, and in the case of parallel arrangement both the mass and the detector needle are resiliently secured on the housing. A further possible mounting for the detector needle comprises fastening the latter with one spring on the housing and with a second spring on the mass. In any arrangement, a connection—generally in the form of one or more springs—is provided between the needle and the mass which connection will apply to the mass the effects due to movement of the needle but which nevertheless will leave the mass practically uninfluenced by the quick oscillations imparted to the needle by the test body.

In order to obtain as sharp and as clear as possible a reproduction of the curve, the distances between the optical devices provided in the apparatus are mutually adjustable. In addition, the picture window may be screened against light entering from outside, for the same purpose.

A light deflecting device, for example a mirror drum, may be driven in various ways, either by an electric motor adjusted to a constant speed or by a spring motor; or else by a constant frequency oscillating motor. The speed of the deflecting members is regulable, i. e. either the motor itself is adjustable in speed by means of resistances, potentiometer or the like, or an infinitely variable multiplying or reduction gear is provided between the motor and the mirror drum.

The apparatus of the invention may also advantageously be employed for measuring pressure, for example in the working cylinders of steam or internal combustion engines. A diaphragm is preferably inserted to this end in an aperture in the working chamber and its oscillations detected and rendered visible by means of the apparatus.

The mass itself is so mounted that it is able to move without being sensitive to the influences resulting from its displacement. Thus, for example, the mass is preferably mounted vertically, as will be described hereinafter with reference to Fig. 6, since this affords particular advantages in respect of insensitiveness to position of the system, by comparison with horizontal suspension.

When the mass is suspended vertically, the gravitational force of the mass acts in the direction of the detector needle, whereas in the case of horizontal mounting the gravitational force of the mass is directed transversely to the detector needle. This means that, when the mass is mounted vertically, the springs are stressed perpendicularly to their plane, and when the mass is horizontally disposed, the weight of the mass is supported by the springs. From the sinusoidal form of a graph representing the variation of the influence of the force of gravity in relation to the displacement of the mass it follows that displacement through a small angle, for example 10°, leads to only slight and practically negligible alterations of the spring load in the case of vertical mounting of the mass. By comparison, deviation to the same extent from the horizontal position would result in a substantially greater variation of the conditions of load then prevailing. These effects will be described hereinafter with reference to Fig. 16 of the drawings.

Further details of the invention can be seen from the embodiments illustrated in the drawings and from the following description of their mode of operation, these being given merely by way of example. In said drawings:

Fig. 1 shows diagrammatically an example of the mode of operation of the apparatus of the invention;

Figs. 2, 3 and 4 different examples of the mounting of the detector needle on a mass suspended in such a way as to be insensitive to vibration;

Fig. 5 a mass rotatably mounted in the housing;

Fig. 6 a mass body preferably to be mounted vertically and consisting, for example, of a hollow cylinder;

Fig. 7 a further example of a rotatably mounted mass having mass bodies disposed in the direction of the detector needle and a regulable limiting screw;

Fig. 8 an example of the suspension of a supplementary oscillating mirror on a tuning fork;

Fig. 9 the construction of a lever transmission gear, shown by way of example;

Fig. 10 a device for transmission at a right-angle, by means of a bell-crank lever, of the oscillation induced;

Figs. 11 to 14 an inertia-free construction of the detector member;

Fig. 15 a device for transmitting oscillation in various directions to the detector member; and Fig. 16 a graphic representation of gravity effects on a horizontally disposed mass as compared with a vertically disposed mass.

Throughout the drawings, similar or corresponding parts are denoted by the same reference numerals.

The light emitted from the source of light 1 (the latter being, as far as possible, in the nature of a luminous point) passes by way of the condenser 2, the diaphragm 3 and the lens 4 into the oscillating mirror 5. The aperture of the diaphragm 3 may, for example, be a slit permitting the passage of a strip-shaped section of the light, this strip of light being radiated by way of the lens 4 (for example, a chromatic lens) into the oscillating mirror 5 and being deflected by the latter to the drum mirror 6 whose axis is at right angles to the axis of movement of the mirror 5. The mirror drum deflects the light impinging thereon in accordance with its position at the time, and projects it in the form of dots on to the ground-glass plate 7. The drum mirror receives its rotary motion from the friction wheel 8, which is driven by the pinion 9 of the motor 10. The desired gear ratio between the pinion 9 and the friction wheel 8 is adjusted by turning the lever 45 by means of the rotary knob 43, which acts direct or with a ratio ensuring fine adjustment. The transmission speed can be read on the scale 44. The oscillating mirror 5 is preferably in the form of a narrow plane mirror and is oscillatably joined on the one hand to the detector or feeler needle 11, and, on the other hand, to the mass 12.

The friction gear is preferably so constructed that the driving pinion consists of a bar magnet and the driven wheel of magnetisable material, so that the force is transmitted substantially through the magnetic adhesion. Bearings permitting a slight displacement in the axial direction are provided for the friction wheel.

The apparatus operates in the following manner:

The mirror 5 is movably positioned between the mass 12 and the longitudinally movable feeler needle 11, so that it converts the oscillations of the body 13 received by the feeler needle, into deflections of the ray of light falling thereon, in the direction of the longitudinal axis of the mirror drum. By the simultaneous turning of the mirror drum 6 about its longitudinal axis, a deflection of the ray of light is produced in a direction perpendicular thereto, so that the wavy line shown dotted, is seen on the ground-glass plate 7. By the oscillations of the test-body, an optical means, namely, the oscillating mirror 5, is operated, whilst, by a second optical means, the mirror drum 6, the reflection of the points of light occur temporarily after one another and follow a wavy line.

The dots of the curve on the mirror 6 are, of course, only produced successively and at periodic intervals, but are visible as a stationary curve, if the time of the succession of two reproductions is so short, as in the continuous rotation of the mirror drum around a mirror, that about 10 to 15 reproductions appear to the second.

The increase in the speed of the drum 6, of course, cannot alter the extent of vibration (shown as $a$ in Fig. 1) but only the breadth of the curve (shown as $b$ in Fig. 1), thus the scale of the time axis.

The detector needle 11 is pressed lightly by its supporting springs 17, 18 against the body 13, the oscillatory properties of which are to be investigated, the oscillations of said body being thereby communicated to the detector needle. This oscillatory movement controls the mirror 5 in such a way that the strip of light impinging thereon, i. e. that detached by said mirror from the light radiated, is deflected to the mirror drum 6 and reflected by the latter in dot form on to the ground-glass plates. In accordance with the amplitude of the oscillation of the oscillating mirror, the light impulse impinging on the facettes of the mirror drum travels to-and-fro along the axis of the mirror drum, is deflected by the rotation of the facettes and built up into a curve. Depending on the speed of rotation of the mirror drum, the amplitudes depicted on the ground-glass plate are stretched out to a greater or lesser extent. The speed at which the mirror drum rotates, or the tilting speed when a tilting mirror is employed, is therefore of great influence on the resulting curve picture. In order to keep the speed of deflection constant for the purpose of obtaining faultless measurements, the motor is preferably so designed that a constantly uniform speed of rotation is provided. However, it should in addition also be possible to adjust the speed of deflection at will. As previously mentioned, this end is achieved either by means of an adjusting device regulating the speed of the motor, for example a brake in the case of a spring motor, or a potentiometer in the case of electric drive. Or the infinitely variable gear is provided between the motor and the mirror drum.

In Figs. 2 to 7 are illustrated various embodiments of the mounting of the mass, Fig. 2 showing a round mass body 12 rotatably mounted in the housing, while to said body is fastened, in a cavity 14, a plate spring 15 the free end of which carries the detector needle 11. The detector needle 11 is, in addition, held by two plate springs 17 and 18 secured in the housing 16. The mirror 5 is connected by a further spring 19 to the mass 12. The arrangement is therefore such that the mirror is moved by relative movement between the needle 11 and the body 12 but not by movement of the housing 16 and not by movement of the needle 11 and body 12 in unison.

The body 12 is sufficiently heavy to ensure that it is insensitive to such rapidly reversing turning moments as would be applied to it, through its resilient connection 15 with the needle 11, during lengthwise oscillation of the needle under the influence of the test body 12. On the other hand, any isolated or slowly occurring or slowly recurring displacements of the needle cause the connection 15 to impose on the body 12 turning moments to which the body responds. The resultant movements of the body, however, occur practically in unison with the needle and therefore the mirror 5 will be moved bodily but will not tilt or rock, so that the record on the plate 7 will be practically uninfluenced. Thus, the effect of the body 12 and its connection 15 with the needle 11 is to damp out all but the quick oscillations which are being investigated and indicated or recorded.

Fig. 3 shows an arrangement of the mass similar to the embodiment shown in Fig. 2, but with the difference that, instead of the plate spring 15 between the mass and the detector needle, small spiral springs 20 and 21 are employed. In addition, a stop 22 is provided to limit the springs 17 and 18 against excessive deflection.

In Fig. 4 a retaining spring 23 is fitted on the axle 24 of the mass body 12 in order to hold the oscillating mirror 5, so that in this arrangement the latter moves in a knife-edge mounting between the spring 23 and the detector needle 11. The body 12 is secured to the axle 24 which is journalled in the housing so that the body 12 is rotatably mounted in the housing.

Fig. 5 shows a mass body 12 which is rotatably mounted in the housing 16 and which carries at its ends screws 25 and 26 respectively, which serve to balance the mass body in the horizontal and vertical positions. In this example the oscillating mirror 5 is mounted in a U-shaped member 19A and is arranged close to the axle 24, to which the body 12 is secured, in order in this way to prevent the transmission into the mass of undesirable torque through the pressure of the detector needle 11 on the mirror. The U-shaped member 19A is secured to the body 12, and the detector needle 11 is connected by way of a spring 17 with the housing 16, and by way of the spring 15 with the body 12.

In Fig. 6 the mass consists of a hollow cylindrical body 12 which is preferably mounted vertically in the housing, and which is carried by the band or spider springs 17 and 18 fastened in the housing, the detector needle 11 being secured to said springs and carrying in its middle (also on band or spider springs 32 and 33) the mass in the form of a hollow cylinder. The oscillating mirror 5 is carried, on the one hand, by a U-shaped or stirrup-shaped spring 34 secured to the mass and, on the other hand, by a portion of the detector needle 11 bent over at right-angles.

Fig. 7 shows certain parts of a similar construction of the same mounting to that illustrated in Fig. 5, other parts being omitted in the interests of clearness. Fig. 7 possesses the difference that two mass bodies 12 are provided parallel to the detector needle 11. In addition, the figure shows an adjustable limit stop for the mass, comprising a spring 36 mounted on the axle 24 to which both bodies 12 are secured and engaging, by means of its fork-shaped end, a recessed portion of the screw 37. In accordance with the movement of the mass, the spring 36 is able to swing to-and-fro in the recess of the screw 37, while the stop limitation provided by the screw 37 may be adjusted from outside in such a way that each time before the apparatus is used it is possible to check and re-adjust the position of the light dot reproduced on the ground-glass screen.

The oscillating mirror 5 is prevented from imparting to the mass a torque due to the pressure of the mirror on the mass, the oscillating mirror being mounted as close as possible to the spindle. In this way no influences harmful to the degrees of freedom of the mass can result. The mass itself is restricted in its possible movement by means of stops, so that it cannot cause damage to the mirror, the detector needle, or the like, even in the case of great vibration of the apparatus.

In addition to the possibility of mounting the mass in such a manner as to enable it to move rotationally or longitudinally, other suitable arrangements of the mass may naturally also be employed. For example, two masses may also be mounted side by side, the oscillating mirror being secured therebetween in suitable manner.

In Fig. 8 is depicted, in an arrangement shown by way of example, a second oscillating mirror which can be mounted near the main oscillating mirror by means of a permanently or interchangeably attached device, and which reproduces on the ground-glass screen a supplementay curve of constant value serving for the purpose of comparative measurements. The oscillating mirror 38 is rotatably mounted, in the embodiment illustrated, between the prongs of a tuning fork 39 which is struck by hand or electromagnetically, for example after the style of a buzzer, and thus provides a constant frequency oscillation of the mirror, which produces, by way of the same optical deflecting means, a standard curve on the ground-glass screen. Other arrangements may naturally be employed for the suspension of this supplementary oscillating mirror, for example the mirror may simply be mounted on a spring tongue subjected to oscillatory excitation.

Fig. 9 shows an infinitely variable lever transmission gear which is used to master as large a range of measurement as possible. This gear may be permanently or interchangeably attached to the apparatus. It consists of a detector needle 27 leading to the outside and preferably robust, said needle transmitting the oscillation communicated to it to a lever 28 which rests on a fulcrum point 30 (which is adjustable with the aid of the screw 29) and passes on the oscillation to the detector needle 11 in accordance with the adjustment of said pivot point. The screw 29 for adjusting the rider 31 carrying the fulcrum of the lever is preferably furnished with an adjusting scale, from which the transmission ratio provided at the time in question by the gear may be read relatively to a scale or mark provided on the housing 16. The gear permits, within a determined range, the conversion of any small or large oscillation instituted into a relatively small maximum oscillation, for example 0.1 mm., of the detector needle 11. The lever 28 is advantageously held in its position by a spring 35.

In Fig. 10 is shown an example of the mounting an angle-piece 40 which serves the purpose of transmitting at a right-angle an oscillation instituted vertically or horizontally by the needle 41 and which is mounted on a knife-edge 42.

In Figs. 11 to 14 are shown further examples of the inertia-free construction of the detector member. In these arrangements the detector is constituted as an assembly of part including a wire or string 48 secured between two springs or diaphragms 46, 47, said wire or string keeping the diaphragms under tension. The diaphragms are fastened in a tube 49 and each carries a detector needle 11 and 50. If the detector needle 11 is contacted by the oscillating body to be examined, the oscillations set up will be transmitted, in consequence of the previous tension of the diaphragm 47, to the diaphragm 46 through the decreasing or increasing of the tension of the wire, the detector needle 50 secured to the diaphragm 46 then transmitting the oscillation imparted thereto to the oscillating mirror.

Figs. 12, 13 and 14 illustrate how the direction of transmission through the detector assembly 11, 48, 50 can be changed. As shown, in each instance the tube 49 is bent. At the right-angle bend shown in Fig. 12, a roller 57 is provided as a support for the wire 48. At the bend shown in Fig. 13, the wire is supported by a short rocking strut 58 pivotally borne by a small socket 59. At the bend shown in Fig. 14, the wire is held by a tie 60.

An advantage associated with the general utility of the apparatus of the present invention is its adaptability to suit variation in the direction of transmission from the oscillatory body through the detector assembly. As illustrated by Fig. 15, the detector assembly is adapted to be brought into any desired direction without displacing the housing and, in consequence, the mass.

The detector needle 11 is carried, in this arrangement, by an end piece 51 which is mounted in the form of a cap on a length of piping 52, carrying the transmission wire 48 and being adapted to slide longitudinally. Said piece of piping is pressed by a pressure spring 53 in such a way that the transmission wire remains constantly under tension, while said tension can be regulated as desired by means of the nut 54. The pipe 55, in which the wire 48 is guided, has its end piece rotatably mounted in a portion of a pipe 56 bent over at right-angles, said pipe 56 being in turn rotatably mounted in the housing 16. In this way the pipe 56 can be adjusted about the vertical axis and the pipe 55 mounted therein can be adjusted about the horizontal axis. A stop position is preferably provided for each of the adjustments, in order to prevent the transmission wire 48 from being twisted round in excess of the permissible degree through being turned round several times in the same direction. If, for example, the stop position for the displacement of the pipe 55 is so provided as to permit a rotation through an angle of 360°, the transmission wire can thus only be twisted through an angle of 180° in either direction.

In the knee-bends of the pipes the transmission wire is guided over rollers. In order to make these rollers of as small a mass as possible, only a sector of the roller is employed, and this is furthermore furnished with suitable weight-saving cavities. For the purpose of giving examples, one of the rollers is shown in the drawings as mounted by means of pins and the other on a knife-edge. It is obvious that the afore-described type of motion and mounting of the detector member may also take different forms, for example still more angle guide pieces may be provided, so that such an apparatus enables even oscillations occurring at unfavourable and otherwise inaccessible points to be examined. An important feature of this apparatus is the automatic regulation of the tension of the transmission wire.

In Fig. 16 is shown graphically the difference between the alteration of the influence of the force of gravity in the case of the displacement of a vertically disposed mass and in the case of the displacement of a horizontally disposed mass. In the diagram is recorded the sine curve resulting from the angle shown on the left, from which can be seen that, when the mass M is displaced from the vertical to the horizontal, the influence of the force of gravity varies in direct relationship to the sine curve. In the event of a deviation from vertical by the amount of the angle $a$, only a slight and practically negligible alteration of this influence occurs, whereas, in the case of a displacement from horizontal by the angle $\beta$ of equal magnitude, a substantially greater alteration of the influence of the force of gravity occurs, which in practice would involve a displacement of the oscillating mirror and thus of the measurement curve appearing on the ground glass screen. From this it is apparent that the suspension of the mass must, for preference, be vertical.

The construction of the apparatus is additionally advantageous in that with its aid an optical enlargement comprising a multiple of that of known devices is obtained with economical constructional means and with a small structural size.

The already mentioned lever gear (Fig. 9) is given the form of a reduction gear for certain uses requiring the detection of oscillations of great amplitude with the aid of the apparatus, and is preferably mounted in the form of an interchangeable attachment in front of the transmission device shown in Fig. 15, since the transmission device and the detector needle joined to the mass are not suitable for taking large oscillations. In this way the oscillations occurring are reduced in accordance with the adjustment at the time of the lever gear and transmitted to the apparatus. If, on the other hand, the apparatus is employed for the detection and measurement of relatively small oscillations, it is preferable either to detect these oscillations directly with the detector needle mounted on the mass, or to employ a multiplying gear increasing the oscillations and acting on the detector needle connected to the mass, neither of these alternatives precluding the employment of the other.

The invention is not restricted to the embodiments illustrated and described, but, in addition thereto, still further structural modifications of the principle of the invention may be made without departing from the scope of the invention.

I claim:

1. A mechanical oscillographic apparatus for visually recording movement of an oscillating body which apparatus comprises a first light-reflecting surface mounted to turn about one axis, a light source, a second reflecting surface mounted to rock about an axis at right angles to the said one axis and arranged between the light-source and said first reflecting surface to reflect a beam of light from said light source to said first reflecting surface, said first reflecting surface also being arranged to reflect said reflected beam from said second reflecting surface along a path at right angles thereto, a viewing surface mounted in the path of said reflected beam from said first reflecting surface, a power source, mechanism drivably connecting said power source to said first reflecting surface for turning it about its said one axis at a uniform rate, detector means for drivably connecting said second reflecting surface to the oscillating body, a relatively heavy mass movably mounted in proximity to said second reflecting surface, a supporting connection extending from said mass to said second reflecting surface and a resilient connection between said detector means and said mass, which connection tends to move said mass in unison with displacement of said detector means.

2. A mechanical oscillographic apparatus for visually recording movement of an oscillating body which apparatus comprises a first light-reflecting surface mounted to turn about one axis, a light source, a second reflecting surface mounted to rock about an axis at right angles to the said one axis and arranged between the light-source and said first reflecting surface to reflect a beam of light from said light source to said first reflecting surface, said first reflecting surface being also arranged to reflect said reflected beam from said second reflecting surface along a path at right angles thereto, a viewing surface mounted in the path of said reflected beam from said first reflecting surface, mechanism drivably connected to said first reflecting surface for turning it about said one axis at a constant rate, means for drivably connecting said second reflecting surface to the oscillating body comprising a rod mounted for longitudinal movement and adapted at one end to bear against the oscillating body, a pivotal connection at the other end of said rod with said second reflecting surface, a mass mounted for movement in proximity to said second surface and provided with a supporting pivotal connection for said second reflecting surface and a resilient connection between said rod and said mass through which connection the effect of displacement of the rod is applied to the mass.

3. A mechanical oscillographic apparatus for visually recording movement of an oscillating body, which apparatus comprises a first light reflecting surface mounted to turn about one axis, a light source, a second reflecting surface comprising a rectangular mirror having two parallel edges longer than the other two thereof, arranged between the light source and said first reflecting surface to reflect a beam of light from said light source to said first reflecting surface, said first reflecting surface being also arranged to reflect said reflected beam from said second reflecting surface along a path at right angles thereto, a viewing surface mounted in the path of said reflecting beam from said first reflecting surface, a power source, mechanism drivably connecting said power source to said first reflecting surface for turning it about said one axis at a uniform rate, a rod resiliently supported to move along its axis by contact with the oscillating body and connected to one longer edge of the mirror, a mass mounted for movement adjacent said rod and connected to the other of said two longer edges of the mirror, and resilient connecting means between said rod and said mass through which connecting means the effect of displacement of the rod is applied to the mass.

4. A mechanical oscillographic apparatus for visually recording movement of an oscillating body, which apparatus comprises a first light reflecting surface mounted to turn about one axis, a light source, a second reflecting surface comprising a rectangular mirror, the second reflecting surface being arranged between the light source and said first reflecting surface to reflect a beam of light from said light source to said first reflecting surface, a viewing surface mounted in the path of reflection of said beam from said first reflecting surface, a power source, mechanism drivably connecting said power source to said first reflecting surface for turning it about said one axis at a uniform rate, a rod resiliently mounted for movement along its axis, a relatively heavy mass resiliently connected to said rod and mounted for displacement thereby, said end of said rod being also connected to said mirror, and a support on said mass pivotally engaging said mirror.

5. A mechanical oscillographic apparatus as claimed in claim 4 comprising a spindle extending transversely through the mass and supporting said mass for pivotal movement in a vertical plane under the action of said rod.

6. A mechanical oscillographic apparatus for visually recording movement of an oscillating body which apparatus comprises a housing, a first light-reflecting surface mounted in said housing to turn about one axis, a light source, a second reflecting surface arranged in said housing between the light-source and said first reflecting surface to reflect a beam of light from said light source to said first reflecting surface, said first reflecting surface also being arranged to reflect said reflected beam from said second reflecting surface along a path at right angles thereto, a viewing surface mounted in the path of said reflected beam from said first reflecting surface, a power source, mechanism drivably connecting said power source to said first reflecting surface for turning it about said one axis and means for drivably connecting said second reflecting surface to the oscillating body said means comprising a rod resiliently supported for axial movement in said housing, said rod having one end resiliently connected to said second reflecting surface, a relatively heavy mass mounted in said housing for movement by displacement of said rod, a resilient movement effecting connection between said rod and said mass, a supporting connection extending from said mass to said second reflecting surface, a pair of diaphragms supported in spaced relationship, a wire connecting the inner surfaces of said diaphragms, a second rod supported to move along its axis having one end connected to the outer surface of one of said diaphragms and its other end adapted to be associated with the oscillating body whilst the outer surface of the other diaphragm is connected to the free end of the first said rod.

7. A mechanical oscillographic apparatus for visually recording movement of an oscillating body which apparatus comprises a housing, a first light-reflecting surface mounted in said housing to turn about one axis, a light source, a second reflecting surface arranged in said housing between the light-source and said first reflecting surface to reflect a beam of light from said light source to said first reflecting surface, said first reflecting surface also being arranged to reflect said reflected beam from said second reflecting surface along a path at right angles thereto, a viewing surface mounted in the path of said reflected beam from said first reflecting surface and lying in front of said one axis, a power source mechanism drivably connecting said power source to said first reflecting surface for turning it about said one axis and means for drivably connecting said second reflecting surface to the oscillating body said means comprising, a rod resiliently supported for axial movement in said housing, said rod having one end resiliently connected to said second reflecting surface, a relatively heavy mass mounted in said housing for movement by displacement of said rod, a resilient movement-effecting connection between said rod and said mass, a supporting connection extending from said mass to said second reflecting surface, a pair of diaphragms supported in spaced relationship, a wire connecting the inner surfaces of said diaphragms, means for tensioning said wire, a second rod supported to move along its axis having one end connected to the outer surface of one of said diaphragms and its other end adapted to be associated with the oscillating body whilst the outer surface of the other diaphragm is connected to the free end of the first said rod.

8. An oscillation indicating apparatus comprising a support, a detector element movable under the influence of a test body, a relatively heavy mass element, both of said elements being mounted on said support, one of them resiliently, a resilient connection between said detector element and said mass element through which connection said mass element is urged to move by and with displacement of said detector element, and optical means including a light director which is supported partly by said detector element and partly by said mass element so as under the control of said detector element when oscillated by the test body to direct light in harmony with the test body.

9. An oscillation indicating apparatus comprising a support, a detector element movable lengthwise under the influence of a test body, a rotationally movable mass element which is heavy, both of said movable elements being mounted on said support, at least one of them resiliently, a resilient connection between said detector element and said element through which connection said mass element is urged to move rotationally in unison with lengthwise displacement of said detector element, and optical means including a light director which is supported partly by said detector element and partly by said mass element so as under the control of said detector element when oscillated by the test body to direct light in harmony with the test body.

10. An oscillation indicating apparatus comprising a support, a detector movable axially under the influence of a test body, a relatively heavy movable mass, said detector being mounted on said support and said mass being resiliently mounted on said detector so that said mass will slowly move coaxially with the detector by displacement thereof and optical means including a light director which is supported partly by said detector and partly by said mass so as under oscillatory actuation of said detector to oscillatingly direct light in harmony with the test body.

11. An oscillation indicating apparatus comprising a support, a detector element oscillatable under the influence of a test body, a relatively heavy insensitive element which by virtue of its weight is insensitive to the action of rapidly alternating force, said detector element being spring mounted on said support and said insensitive element being wholly spring supported by said detector element, and optical means including a light director which is supported by both of said elements and operated under the actuation of said detector element to oscillate in harmony therewith.

12. A mechanical oscillographic apparatus as claimed in claim 2 comprising a housing in which the rod and the mass are mounted, a U-shaped member supported by the mass, and a long rectangular mirror pivotally mounted in said U-shaped member, said mirror presenting the second light reflecting surface and having one of its longer sides pivotally connected midway of its length to said rod.

HEINRICH LIST.